June 11, 1946.  C. C. S. LE CLAIR  2,402,114
FLEXIBLE PACKING OR SEALING RING
Filed Feb. 16, 1944   2 Sheets-Sheet 1

Inventor
C.C.S. LeClair
By
Kimmel & Crowell Attorneys

June 11, 1946.  C. C. S. LE CLAIR  2,402,114
FLEXIBLE PACKING OR SEALING RING
Filed Feb. 16, 1944  2 Sheets-Sheet 2
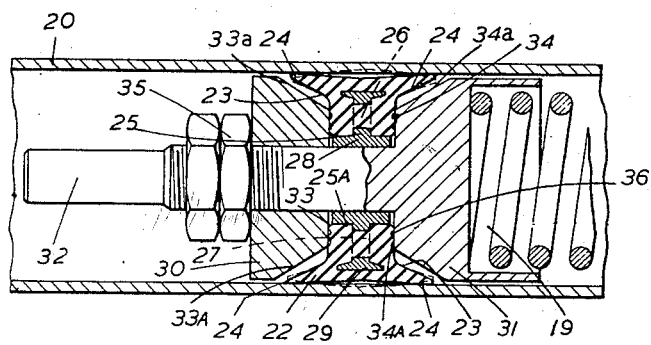
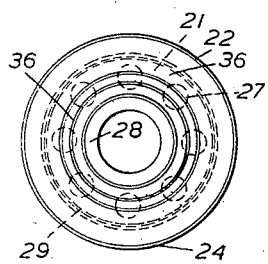
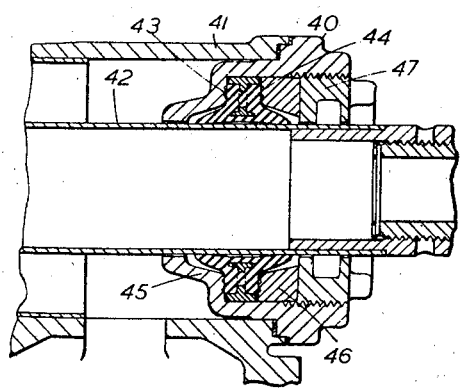
Inventor
C.C.S. LeClair
By
Kimmel & Crowell Attorneys Patented June 11, 1946

2,402,114

UNITED STATES PATENT OFFICE 2,402,114

FLEXIBLE PACKING OR SEALING RING

Camille Clare Sprankling Le Clair, Acton, London, England

Application February 16, 1944, Serial No. 522,643
In Great Britain March 11, 1943

11 Claims. (Cl. 288—4)

This invention relates to flexible packings of the type used to effect fluid-tight joints between parts of machinery having motion relative to one another, such as, for example, piston rods moving through cylinder covers, pistons sliding in or on cylinders, or rotating shafts.

The invention relates more particularly to those forms of flexible packing, in which the pressure of the liquid to be held is used to deflect the packing and keep it in fluid-tight contact with the moving or fixed part. Such packings are well known in the form of "cup" leathers, U leathers, or "hat" leathers, common applications thereof being for hydraulic rams and the like.

Due to the introduction of synthetic rubber and other similar substances capable of being moulded into many shapes that cannot be made from leather, the use of such flexible packings has greatly extended of late years. They are now known broadly as "sealing rings" and they will be referred to as such hereinafter.

In the description which follows, the word "rubber" is used in the general sense to include all such mouldable materials capable of being used as sealing rings.

A difficulty that often arises in the use of such sealing rings is, however, that where, say, one or more pressure-sensitive or sealing edges is or are used to effect a fluid-tight seal, it is frequently necessary to secure the sealing ring to a sliding or fixed part by means of a flange or disc part clamped between two metal faces. For a given pressure, rubber distorts far more than leather and although cup leathers are often heavily clamped between their clamping faces, this does not adversely affect their sealing edges. In order to effect a joint and to prevent the leakage of fluid, such clamping must be fairly heavy and such heavy clamping distorts the shape of the rubber in such a way that the pressure-sensitive or sealing edges may be deflected away from the part to be sealed, thus permitting the fluid to be held to seep down and escape.

A sealing ring constructed in accordance with the present invention overcomes the above disadvantage in that it includes a rigid reinforcing ring, which is preferably inserted into the mould in which the sealing ring is made before the rubber is introduced, and thus becomes firmly embedded in the body of the seal.

The reinforcing ring is so shaped and disposed in the body of the seal that it lies, so to speak, "between," though not necessarily in a straight line between holding faces on the body of the seal and the pressure-sensitive or sealing edge or edges of the seal in such a manner that it resists the distortion of the edge or edges due to pressure applied to the holding faces.

By the expression "between holding faces on the body of the seal and the pressure-sensitive or sealing edge or edges" is meant between the cause of the distortion, i. e., the pressure applied to the holding faces by clamping means, and the effect of such pressure, i. e., the inward or outward distortion of the pressure-sensitive or sealing edge or edges away from the member with which the edge or edges are intended to form a fluid-tight seal. Further, by the expression "not necessarily in a straight line between" is meant that the reinforcing ring does not necessarily lie in a straight line between the said holding faces and the pressure-sensitive or sealing edge or edges.

In practice, however, partly to allow for manufacturing errors, etc., also to ensure that the ring is gripped sufficiently tightly to prevent its moving due to friction and also to ensure a pressure-tight joint between the clamping faces and the rubber, a certain amount of distortion is unavoidable and must be permitted. This invention, therefore, also provides means, such as, for example, annular gaps or grooves or series of dimples or other depressions disposed in the holding faces between the clamping surfaces and the reinforcing ring, or alternatively in the clamping surfaces themselves, so as to afford space into which material distorted by the clamping pressure can flow. Unavoidable distortion is thereby localised to a part of the seal where it can do no harm and is kept away from the pressure-sensitive edge or edges where its presence would cause leakage. Thus, when the sealing ring is clamped in position, the pressure-sensitive edge or edges are not forced outwardly (or inwardly) away from the moving or fixed part with which the sealing ring cooperates to effect the fluid-tight seal.

The invention is obviously applicable to sealing rings which are fitted around a fixed or movable part, to sealing rings which are fitted inside a fixed or movable part and to sealing rings which are used in conjunction with rotating shafts or other members. In the case of the first mentioned sealing rings the holding faces are conveniently provided on an external flange projecting from the apertured central part of the rubber body and in the case of sealing rings which are fitted inside a fixed or movable part, the holding faces are conveniently provided on a flat central part of the rubber body, which part may or may not be apertured.

Generally speaking, it has been found convenient to use a metallic reinforcing ring having a section of revolution substantially of H-form. The cross of the H forms a flat apertured disc through which a number of holes are formed which will eventualy be filled with rubber during the moulding operation to form keys and the upright parts of the H form two concentric cylindrical flanges, inner and outer. If the sealing ring is of the kind which fits around a moving or fixed part, the said inner flange and the flat part of the reinforcing ring are wholly embedded in the rubber, but the outer flange is not wholly embedded in the rubber but lies against the outer surface of the rubber. If, however, the sealing ring is of the kind which is apertured centrally and is fitted inside a moving or fixed part, the outer flange is wholly embedded in the rubber but the inner flange is not wholly embedded but lies against the wall of the hole through the rubber.

In either case, the rubber body is, or may be, disposed symmetrically about the metal reinforcing ring, as viewed in section.

Two constructional forms of the invention are shown, by way of example, on the accompanying drawings, whereon:

Fig. 3 is a sectional view of a piston adapted to slide in a tube and fitted with an alternative form of sealing ring;

Fig. 4 is a face view of the sealing ring; and

Fig. 5 is a sectional view of a cylinder cover fitted with a sealing ring through which a hollow rod or tube is slidable.

Figure 1:
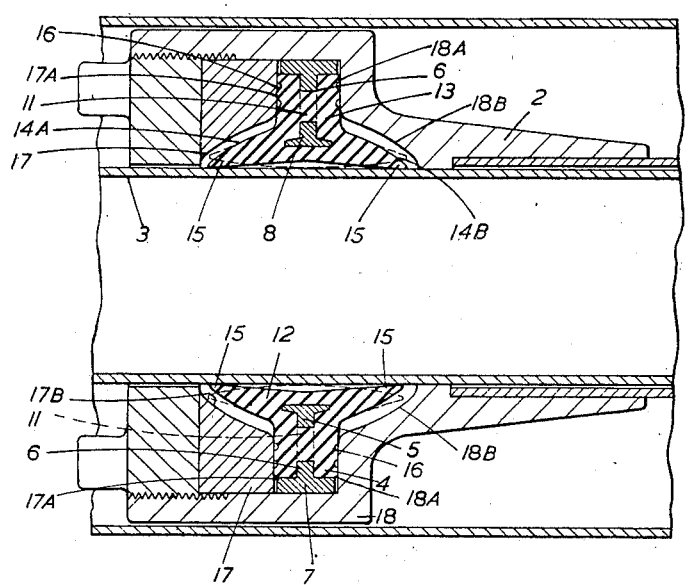
Fig. 1 is a sectional view of a hollow piston adapted to slide upon a tube and fitted with one form of sealing ring.
Figure 2:
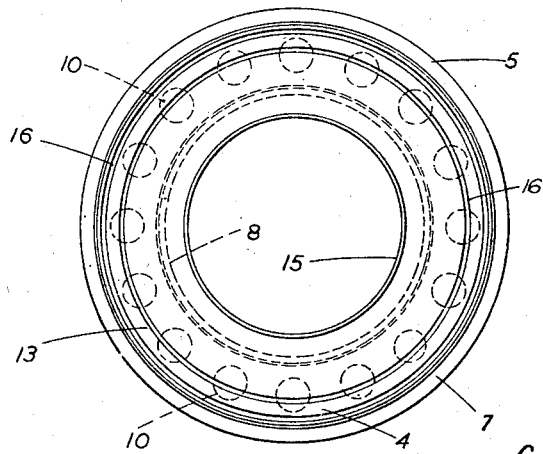
Fig. 2 is a face view of the sealing ring.

Referring to the drawings:

Figs. 1 and 2 show one constructional form of the invention, as applied to a sealing ring for effecting a liquid-tight seal between a hollow piston 2 slidable on a tube 3. The sealing ring includes a synthetic rubber ring 4 moulded on to, and symmetrically about, a metallic reinforcing ring 5, which comprises a flat part 6 provided with an outer peripheral flange 7 and an inner peripheral flange 8. The inner and outer walls of these flanges may be parallel as shown in the case of the flange 7 or alternatively, if preferred, slightly tapered as shown in the case of the flange 8 so as to facilitate the flow of rubber during moulding or the insertion of the ring into the mould. A number of spaced holes 10 are formed in the flat part 6 of the reinforcing ring between the outer and inner flanges. The metallic reinforcing ring is supported in the mould by the outer flange 7 before the rubber is introduced into the mould so that, eventually, all except the outer flange becomes firmly embedded therein, rubber keys 11, connecting the two parts of the rubber body on opposite sides of the reinforcing ring, being formed through the said holes. The rubber body is formed with an apertured central boss 12, from which projects a lateral flange 13, the thickness of which is less than the length of the boss. The outer flange 7 of the reinforcing ring encircles the outer face of the said lateral rubber flange 13 but it is slightly narrower than the latter for a reason explained hereinafter. The inner flange 8 and the flat part 6 of the reinforcing ring, however, are wholly embedded in the rubber. The outer walls 14A and 14B of the boss or central part of the rubber ring are tapered inwardly towards its ends and the bore of the boss is also usually slightly tapered inwards towards its ends as shown in Fig. 1, the combination of these tapers providing pressure-sensitive or sealing edges 15 at both ends of the boss.

In the faces of the central rubber flange 13 are cut or moulded one or more circular grooves 16 and the edges of the rubber adjacent to and standing proud of the outer flange 7 of the reinforcing ring are chamfered back at approximately 45°. The said grooves may be replaced by or employed in association with gaps or a series of dimples or other depressions.

When in use, the sealing ring is arranged around the said tube 3 and clamped in position within the said piston by means of two relatively movable members 17 and 18 forming part of the piston and providing two clamping faces 17A and 18A, one of which bears against one face of the said lateral flange 13 and one against the opposite face. Thus, when one of said clamping faces is forced towards the other face, the lateral flange 13 is clamped firmly between the two clamping faces, and the reinforcing ring 5 resists any tendency for the central part or boss of the rubber ring to become distorted and thereby prevents the pressure sensitive edges 15 being moved out of contact with the said tube 3, as shown, for example by the broken lines in Fig. 1.

In order that the rubber ring may be gripped sufficiently to prevent its moving due to the friction of the member 3 sliding within it, and also to ensure a pressure tight joint between the clamping faces and the rubber, it is necessary to apply a certain amount of pressure which, of course, leads to a certain amount of deformation, see the broken lines in Fig. 1. Further, if due to manufacturing errors one sector of the flange 13 is thicker than another the amount of deformation will not be uniform all around the circumference. The amount of such deformation, is however, limited to a predetermined amount by making the width of the external flange 7 slightly less than the thickness of the lateral rubber flange 13 as previously mentioned and arranging it to form a stop against which the clamping faces 17a and 18a may be tightened hard without gripping the rubber body so tightly as to deform it in spite of the support afforded by the reinforcing ring. It will also be observed that the members 17 and 18 carrying the clamping faces 17a and 18a are shaped as shown at 17b and 18b to form housings which surround the sealing member fairly closely but do not contact it or interfere with its free action in any way.

To allow for this limited but unavoidable deformation, the concentric grooves 16, or the other depressions mentioned above, are formed so as to provide spaces into which the rubber so deformed may flow and the outer edges of the flange 13 adjacent to the outer flange 7 of the reinforcing ring are chamfered back, say at 45°, to prevent any rubber becoming entrapped between either clamping face and the edge of the outer flange 7.

The modified construction shown in Figs. 3 and 4, is applied to a sealing ring for effecting a liquid seal between a piston 19 and a cylinder 20. The rubber sealing ring comprises a central, flat apertured disc and an outer peripheral rim 22, the inner walls 23 of which, on opposite sides of the central disc are tapered outwardly. The outer walls are also tapered outwardly though to a lesser extent and the combination of the two tapers provides each of the two ends of the rim with a tapered pressure-sensitive or sealing edge 24. In this construction, the metallic reinforcing ring again comprises a flat disc 26 formed with a number of holes 27 and having inner and outer flanges 28 and 29 but in this case the outer flange 29 and the disc 26 are wholly embedded in the rubber, while the inner flange 28 lies on the inside of the wall of the flat disc part of the body bordering the central hole 25A formed therein, and is not wholly embedded. The piston is made in two parts 30 and 31, of which the main part 31 is provided with an extension 32 which is passed through the hole 25A in the reinforcing ring. The other or subsidiary part 30 of the piston is mounted upon the extension, and clamping faces 33 and 34 provided on the two parts of the piston bear on opposite sides of the central flat disc 21 of the sealing ring. The parts 30 and 31 of the piston are formed as at 33a and 34a to act as housings for the sealing ring but do not embrace it so tightly as to interfere with its free action. The two parts 30 and 31 of the piston are forced towards each other by a nut 35 screwed on the said extension and bearing against the subsidiary part 30. As in the preceding construction, the unembedded flange 28 of the reinforcing ring is narrower than the flat disc 21 of the rubber body, permitting a certain limited measure of deformation in tightening up, which deformation is again taken up by grooves 35 or the like in the holding faces of the disc 21 as previously described.

The edge of the rubber adjacent to, and proud of, the unembedded flange 38 is again chamfered at approximately 45°, for the same reason as mentioned above.

Fig. 5, shows the application of a sealing ring constructed in accordance with the invention to a cover 40 adapted to close the end of a cylinder 41. It will be seen that the sealing ring is similar to that described with reference to Figs. 1 and 2 and comprises a rubber body part and a metallic reinforcing ring, the purpose of the sealing ring being to provide a fluid-tight joint with a tubular member 42 which is slidable through it. The sealing ring is firmly clamped between clamping faces 43 and 44, which are provided respectively upon the hollow main part 45 of the cylinder cover and a clamping ring 46 forced into contact with the holding face of the sealing ring by an apertured cap 47 screwed into the part 45.

All the sealing rings described with reference to Figs. 1 to 5 are provided with two spaced, pressure-sensitive or sealing edges. As mentioned above, however, the sealing ring may be provided with one pressure-sensitive or sealing edge only. As also mentioned above, the sealing rings are adapted to be used in association with rotating shafts or other rotating or oscillating members.

I claim:

1. A sealing ring including a rubber body having a flat, central part or disc, providing holding faces adapted to be gripped between clamping faces in order to hold the ring in its working position, and an outer rim which is integral with the central disc and is so shaped as to provide a pressure-sensitive or sealing edge at one of its ends at least, and a reinforcing ring which comprises a flat central disc and an outer circular flange, both of which are wholly embedded in the rubber body, and an inner circular flange which lies against the inner surface of the said central part or disc of the rubber body.

2. The sealing ring claimed in claim 1, wherein the said reinforcing ring is of substantially H-section.

3. The sealing ring claimed in claim 1, wherein both the inner and outer walls of the said outer rim of the rubber body are tapered outwardly toward one of its ends at least so as to form the pressure-sensitive or sealing edges.

4. A sealing ring, comprising in combination an annular rubber body which includes a flange part, holding faces on opposite sides of said flange part whereby said ring may be gripped between clamping faces serving to hold the ring in its working position, a seal-forming peripheral portion integral with, and projecting on opposite sides of, said flange part, a pressure sensitive sealing edge at one end at least of said seal-forming portion, and a reinforcing ring of rigid material comprising a disc part which is wholly embedded in said rubber body, and a circular flange part which is integral with said disc part and lies against the peripheral surface of said flange part of the rubber body remote from said seal-forming peripheral portion of the rubber body.

5. The sealing ring claimed in claim 4 wherein said disc part of the reinforcing ring is also integral with a second flange part which is wholly embedded in said rubber body.

6. A sealing ring, comprising in combination a rubber body which includes a central apertured boss, an outer flange integral with, and projecting radially outwards from, said boss, said flange being narrower than said boss and providing holding faces on opposite sides whereby said ring may be gripped between clamping faces serving to hold the ring in its working position, a pressure sensitive sealing edge at one end at least of said boss, and a reinforcing ring of rigid material comprising a central disc part which is wholly embedded in said body and an outer circular flange which is integral with said disc part and lies against the outer peripheral surface of the outer flange of said rubber body.

7. A sealing ring, comprising in combination a rubber body which includes a central apertured boss, and outer flange integral with, and projecting radially outwards from, said boss, said flange being narrower than said boss and providing holding faces on opposite sides whereby said ring may be gripped between clamping faces serving to hold the ring on its working position, a pressure sensitive sealing edge at one end at least of said boss, and a reinforcing ring of rigid material comprising a central disc part, an inner circular flange, said flange being wholly embedded in said ring, and an outer circular flange which lies against the outer peripheral surface of the outer flange of said rubber body.

8. A sealing ring claimed in claim 7, wherein said central disc part of said reinforcing ring is formed with a number of spaced holes which during the moulding operation are filled with rubber, thereby providing keys serving to connect the parts of the rubber on opposite sides of said disc part.

9. The sealing ring claimed in claim 7, wherein the said holding faces are formed with depressions into which rubber distorted by the pressure of said clamping faces upon said holding faces can flow, whereby unavoidable distortion is localized to a part of the sealing ring and kept away from the pressure sensitive sealing edges.

10. The sealing ring claimed in claim 7, wherein both the outer and inner walls of the said central boss of the rubber body are tapered inwardly towards one of its ends at least so as to form the pressure-sensitive sealing edge.

11. The sealing ring claimed in claim 1, wherein the said holding faces of the rubber body are formed with depressions into which rubber distorted by the pressure of the said clamping faces upon the holding faces can flow, whereby unavoidable distortion is localized to a part of the seal and is kept away from the pressure-sensitive or sealing edges.

CAMILLE CLARE SPRANKLING LE CLAIR.